June 20, 1944.  M. SITNEY  2,351,883
SMOKER'S PIPE
Filed Nov. 20, 1940
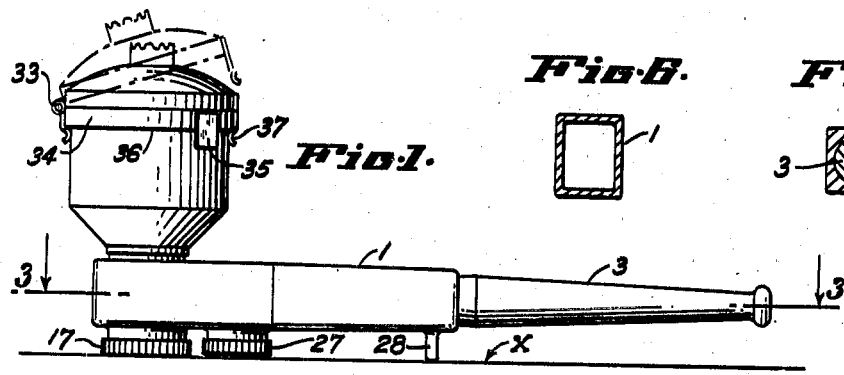
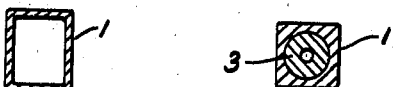
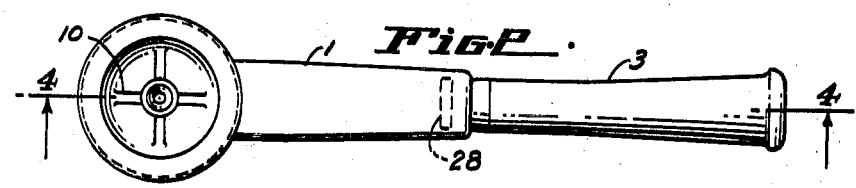
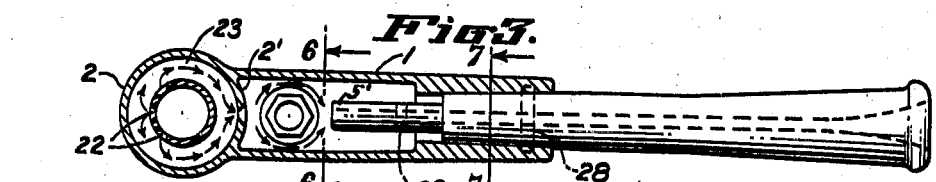
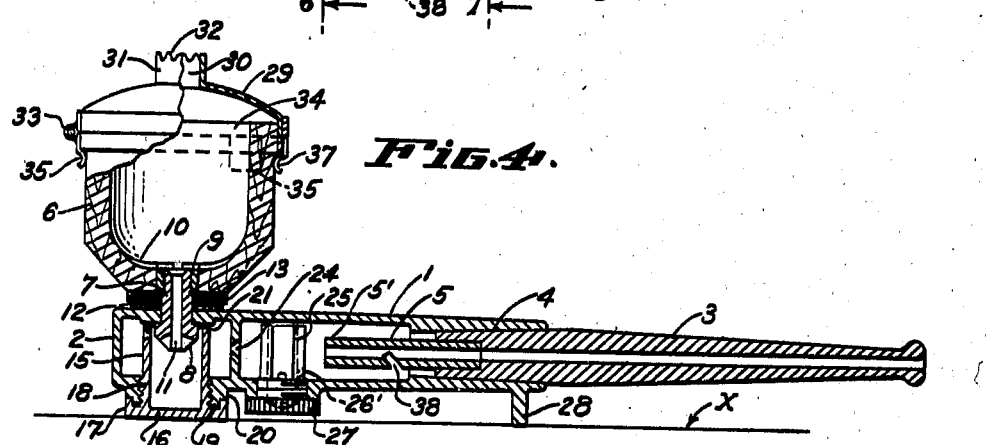
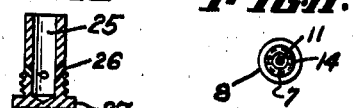
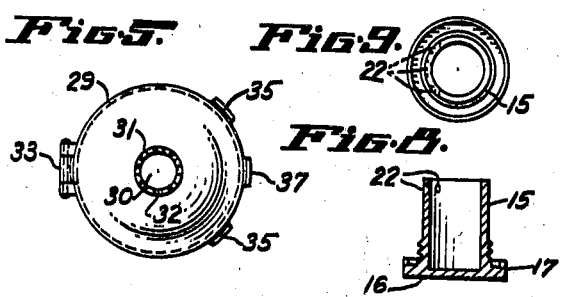
INVENTOR.
MASSEY SITNEY.
BY
ATTORNEY.

Patented June 20, 1944

2,351,883

UNITED STATES PATENT OFFICE 2,351,883

SMOKER'S PIPE

Massey Sitney, Berkeley, Calif.

Application November 20, 1940, Serial No. 366,347

1 Claim. (Cl. 131—201)

This invention relates to tobacco smokers' pipes in general, and in particular to pipes having a hollow metal stem, and the invention has for its principal object the provision of means for maintaining a cooler pipe stem, and cooler condensing or precipitating chamber and baffles contained within the pipe stem, whereby the smoke is cooler to the tongue and freer from objectionable oils and liquids from the tobacco. A feature is the thermal insulation of the pipe bowl from the stem to prevent the metal conducting the heat from the bowl, so as to keep the stem as cool as possible for the above purposes, also improved baffle means is provided to aid in the precipitation of the liquids and cooling of the smoke, together with associated means for facilitating the emptying of the condensed liquids and cleaning of the pipe and stem. Additional features are the preservation of the draft while preventing the accidental overflow or spilling of hot embers from the pipe. Other features and advantages of the construction will appear in the following description and the accompanying drawing.

In the drawing:

Fig. 1 is a side elevation of my improved pipe embodying the features above set out.

Fig. 2 is a plan view of the pipe of Fig. 1, but with the bowl cover removed.

Fig. 3 is a cross-section of Fig. 1 taken along the line 3—3 thereof.

Fig. 4 is a cross-section of Fig. 2 taken along the line 4—4 thereof, but showing the bowl cover in place.

Fig. 5 is a plan view of the bowl cover.

Fig. 6 is a cross-section of the pipe stem as seen from the line 6—6 of Fig. 3.

Fig. 7 is a cross-section of the pipe stem as seen from the line 7—7 of Fig. 3.

Fig. 8 is a detached vertical cross-section of the liquid sump of the pipe as shown in Fig. 4.

Fig. 9 is a plan view of Fig. 8.

Fig. 10 is a vertical cross-section of the secondary sump or tubular baffle shown in Fig. 4.

Fig. 11 is a bottom plan view of the hollow metallic nipple which secures the bowl to the stem.

Generally speaking, my pipe is of the type in which there is a relatively large hollow metallic stem with a mouth-piece fitted to and projecting from one end of the stem and with the bowl of the pipe secured to the upper side wall of the stem, the extreme outer end of the stem being closed, and the various sumps and smoke baffles being arranged within the hollow stem, and other cooperating features of construction connecting the bowl to the stem and providing for the control of the draft.

In the drawing, 1 designates a hollow metallic stem, in the present instance being of substantially square cross-section as shown in Fig. 6, closed at its outer end 2 and fitted at its inner end with a mouth-piece 3, in the present instance this being a non-metallic mouth-piece shown with a long tapered wedge fit at 4, and the inner end of the mouth-piece being provided with a frictionally fitting inwardly projecting relatively small tube 5 which extends freely into the relatively large space within the stem. Adjacent the outer end of the stem and seated upon its upper wall is a tobacco bowl 6, preferably of briar, and which bowl is secured in position on the hollow stem by means of a hollow nipple 7, which is provided with a slotted head 8 at its under side engaging the inner wall of the stem and threaded at its upper end where it engages a ferrule 9 which is preferably of metal either tightly pressed, and/or cemented and/or finely threaded or roughened for securing an immovable grip within the central lower bore of the pipe bowl. It should be noted that the upper end of this ferrule is countersunk below the bottom of the bowl, and the bottom of the bowl is grooved or slotted downwardly to the upper end of the ferrule 9 as indicated at 10 in Fig. 2, to thereby provide smoke channels leading to the central bore 11 of the nipple.

For the purpose of preventing as much heat from being communicated to the metallic stem 1 as possible I provide a relatively thick, and preferably laminated asbestos or other heat insulating washer 12 between the bottom of the bowl and the upper side of the stem. This washer is surmounted with a thin metallic cupped washer 13 which is in contact with the lower side of the bowl and has its cupped edge overhanging the washer. Fig. 11 shows the lower end of the hollow nipple and also a transverse slot 14 therein for the insertion of a screwdriver from below in tightening the assemblage.

Directly below the smoke passage 11 and surrounding the projecting end of the nipple is a tubular sump 15 which has a solid bottom 16 extending laterally and formed with a milled edge 17. This sump member is threaded as at 18 and screwed into a rimmed opening formed in the lower wall of the stem and it is also provided with a small gasket ring 19 which is clamped between the upper side of the milled edge 17 and the rim 20 of the lower wall opening. When this tubular sump is screwed into place it leaves a minute space between its upper end and the lower side of the upper wall of the stem as indicated at 21. This insures tight seating of the gasket 19 and also provides a very narrow crack for some of the smoke to get out of the chamber. As a further means of providing for the exit of the smoke, openings 22 are formed adjacent the upper end of the sump member 15 at a point so they will be directed toward the dead end 2 of the stem when the sump is screwed home, and thus in order to reach the mouth-piece they must make a turn clear around the sump in the direction of the small arrows shown in Fig. 3, in an annular passage 23 formed by the wall 2 of the hollow stem which is circular at this point to form a separate or second condensing chamber within the stem of somewhat greater width than the main body 1 of the stem. This circular wall 2 extends across the inner space of the stem as at 2' and where it is provided with one or more preferably central smoke openings 24.

Positioned between the circular wall 2' and the outer end 5' of tube 5 is an upwardly projecting baffle 25. This baffle is also preferably tubular and is threaded at 26 and provided with a milled head 27, and is screwed in through an opening in the bottom wall of the stem in the same manner as is the sump 15, and likewise extends upwardly almost to the under side of the upper wall of the stem 1 as shown in Fig. 4. This tubular baffle 25 forms not only a baffle for the smoke emerging from the opening 24 and diverts it around both sides as indicated by the small arrows in Fig. 3, but likewise forms a second chamber or sump to receive further condensation of the liquids, and is accordingly provided with one or more drainage openings 26' for this purpose. It should also be noted that preferably the baffle 25 is of a polygonal form, or externally ribbed with sharp edges, as it is found to better condense any moisture or oils in the smoke not previously precipitated. It should also be observed that the end 5' of the projecting mouth-piece tube 5 comes adjacent the center of this baffle so that the smoke can only enter it after circulating around the same. A feature to be noted in that the tube 5 is also preferably slotted underneath in a slanting manner as indicated at 38 for drainage of liquids into the stem space. The milled head 27 of the combined sump and the baffle 25 may be made liquid tight by proper finish and may also have a gasket as shown at 19 for the tubular sump and baffle 15, into which the smoke is first directed for precipitation of most of its liquid content.

Formed on or secured to the under side of the stem 1 at 28 is a transversely extending rib or leg which is made of a length to project downwardly substantially to the same point as the lower side of the sump bottom 16 so that the pipe may be stood in upright position thereon as indicated in Fig. 1, and wherein the dotted line X indicates the top of a table upon which the pipe has been stood. This is particularly important with this type of pipe to prevent the condensed liquids in the sumps from overflowing when they contain excess liquid which the smoker has neglected to empty.

I have found it desirable to localize the incoming air to the pipe bowl and make it enter substantially from a central point above the bowl and to thus create a better draft. I have therefore provide a shell-like cover 29 which is preferably of dome shape as indicated, and provided with one or more centralized openings as at 30 surrounded by an upwardly projecting rim 31 which may be more or less ornate at its upper edge as indicated at 32. This cover is preferably detachably mounted on the upper end of the bowl so that it may be quickly and entirely removed for cleaning the pipe, and at this end it is shown as hinged (at 33), to a rim member 34 which surrounds the upper edge of the pipe bowl, and which rim is itself frictionally held in place by means of thin resilient snap lugs 35 which engage under the edge 36 of a bead formed around the pipe bowl. At a point on the cover diametrically opposite the hinge 33 is also a spring lug or lip 37 formed on or projecting downwardly from the cover to likewise snap under the bead 34. By this means the cover may either be thrown back on its hinge 33 while leaving the rim in position on the bowl or else the entire assemblage may be pulled off the top of the bowl, as the spring lugs or lips will all disengage the bead of the bowl if a little force is used.

By the construction of the cover set out it will be evident that a match or toothpick may be shoved down through the central opening 30 and the tobacco may be stirred around or mixed up to insure even burning, yet the cover may easily be opened when desired, or entirely removed. The position of the central opening 30 has been found to make a better draft through the tobacco and also provide against the objectionable effects of cross air currents over the top of the bowl, especially on a windy day.

By the construction described, the advantages of a cool metal stem, and cool condensing chambers and baffles for purifying and cooling the smoke are obtained. The smoke reversing effect of the several baffles with its consequently chilling effect on the smoke and precipitation of liquid matter from the tobacco is thus realized to the fullest extent, while the heat insulation between the bowl and the stem reduces the amount of heat transferred from the bowl to the stem. Besides this, the metal stem insures against overheating of the stem when held in the hand and does not lose its liquid condensation coolness during the normal use of the pipe. The facility for quickly emptying the combined sumps and condensing chambers requires no further comment, and it will be evident that when the secondary sump 25 is unscrewed, any condensed liquids in the main stem space may also be freely emptied out. Also it will be seen that when the main sump 15 is removed it makes the securing means 7 for holding the bowl in place accessible for quickly disassembling this if desired, so that the metallic stem may be thoroughly washed, especially if the mouth-piece 3 is first pulled out.

I am aware of course of other pipes of this general description and in which a metallic stem is provided with a non-metallic mouth-piece and a non-metallic or briar bowl, but I am not aware of any which have the combined advantages above described. While I show a metallic nipple 7 connecting the pipe bowl to the stem, it is evident that any heat resisting material or tough refractory material other than metal may be used, and will, if used, lessen the heat transfer from the bowl to the stem, and which is desirable, though of course such other material, if used, would be accompanied with less strength at this connecting point. It is also evident that instead of providing the ferrule 9 within the bottom of the pipe bowl, the briar or other substance of which the bowl is made could be directly threaded, but likewise would not have the permanency of the construction shown.

I therefore claim:

In a smoker's pipe having a hollow metal stem and a bowl on the top side of the stem, and with a downwardly removable moisture sump in the stem under the bowl, means detachably securing said bowl to the stem comprising a ferrule passing upwardly through the upper wall of said hollow stem and screwed into the lower end of the bowl, and said ferrule provided with a head engaging the inner under side of the upper wall of the stem and formed to project downwardly into said sump to discharge the smoke from the bowl toward the bottom of said sump.

MASSEY SITNEY.